United States Patent
Ogawa (10) Patent No.: US 7,496,724 B2
(45) Date of Patent: Feb. 24, 2009

(54) LOAD BALANCING IN A MIRRORED STORAGE SYSTEM

(75) Inventor: Junji Ogawa, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 244 days.

(21) Appl. No.: 11/453,674

(22) Filed: Jun. 14, 2006

(65) Prior Publication Data

US 2007/0245081 A1 Oct. 18, 2007

(30) Foreign Application Priority Data

Apr. 7, 2006 (JP) ............................ 2006-106487

(51) Int. Cl.
*G06F 13/14* (2006.01)

(52) U.S. Cl. .................. 711/162; 711/161; 711/114

(58) Field of Classification Search .................. None
See application file for complete search history.

(56) References Cited

U.S. PATENT DOCUMENTS 5,623,598 A 4/1997 Voigt et al.
2004/0103254 A1* 5/2004 Satoyama et al. ............ 711/150
2006/0031648 A1* 2/2006 Ishikawa et al. ............. 711/162
2006/0271758 A1* 11/2006 Innan et al. .................. 711/170
2007/0101082 A1* 5/2007 Sugiura et al. ............... 711/165

FOREIGN PATENT DOCUMENTS

JP 08-241227 9/1996

* cited by examiner

*Primary Examiner*—Than Nguyen
(74) *Attorney, Agent, or Firm*—Sughrue Mion, PLLC

(57) ABSTRACT

Optimal performance tuning is enabled by avoiding the deterioration in the performance of a storage system caused by an erroneous setting in a tuning parameter. The storage system has a primary volume provided as an operational volume to a host computer, and a secondary volume capable of forming a copy-pair with the primary volume. When the load demanded in executing I/O processing to the secondary volume set with a second tuning parameter is lighter than the load demanded in executing I/O processing to the primary volume set with a first tuning parameter, the storage controller switches the primary/secondary relationship between the primary volume and secondary volume and provides the secondary volume as the operational volume to the host computer.

8 Claims, 8 Drawing Sheets

COPY VOLUME MANAGEMENT TABLE 112

| HOST LUN | PRIMARY VOLUME LUN | SECONDARY VOLUME LUN |
|---|---|---|
| 0 | 0 | 1 |
| 3 | 8 | 4 |
| 10 | 7 | 9 |

FIG.5

TUNING PARAMETER MANAGEMENT TABLE 122

| LUN | PREFETCH | RAID GROUP | DISK TYPE | STRIPE SIZE |
|---|---|---|---|---|
| 0 | ON 1MB | RAID5 4D+1P | FC 15Krpm | 64KB |
| 1 | ON 256KB | RAID5 3D+1P | FC 15Krpm | 512KB |
| 2 | OFF | RAID10 2D+2P | SATA 7Krpm | 512KB |

LOAD BALANCING IN A MIRRORED STORAGE SYSTEM

CROSS-REFERENCES TO RELATED APPLICATIONS

This application relates to and claims the benefit of priority from Japanese Patent Application No. 2006-106487, filed on Apr. 7, 2006, the entire disclosure of which is incorporated herein by reference.

BACKGROUND

1. Field of the Invention

The present invention relates to a storage system and its performance tuning method.

2. Description of Related Art

With the development of computer system technology, the use of storage systems is becoming diversified. Input/output (I/O) characteristics of a host computer that requests I/O processing to a storage system are also becoming diversified. In order to design a storage system having high performance in various types of I/O characteristics, it is desirable to perform optimal performance tuning to the respective I/O characteristics.

I/O characteristics of a host computer may change time to time. The temporal change of I/O characteristics can be broadly classified into a short-term change of I/O characteristics (for instance, change of I/O characteristics in a short cycle such as when backup processing is executed at night), and a long-term change of I/O characteristics (for instance, change of I/O characteristics in a long cycle such as when the load increases pursuant to the increase of I/O processing requests from the host computer).

Japanese Patent Laid-Open Publication No. H8-241227 discloses a method for evaluating the performance of an active storage system for the purpose of monitoring or predicting a state that will have an adverse effect on the performance of such storage system and, when it is detected that the performance is not optimal, warning the user to enable the user to take measures to improve the performance.

SUMMARY

It should be noted that a tuning parameter for tuning the performance of a storage system may include a tuning parameter relating to internal control, and a tuning parameter relating to external specification. The tuning parameter relating to internal control may include, for example, "prefetch" of sequential reading and "collective writing" of sequential writing. The tuning parameter relating to external specification, for example, may include "RAID level", "drive configuration", "disk type", "stripe size" and the like.

These tuning parameters are changed in anticipation of upgrading the storage system. Nevertheless, when the setting of the tuning parameter is mishandled, there are cases where the performance will deteriorate rather than improve. When deterioration in the performance of the storage system is discovered, it is necessary to return the tuning parameter to its original setting.

Nevertheless, when attempting to restore the tuning parameter relating to external specification, because it is necessary to perform data migration among the disk drives, the load on the storage system resulting from changing the tuning parameter will be significant, and much time will be required for the operation. In addition, the performance of the storage system will deteriorate while the tuning parameter is being changed, which is undesirable.

Moreover, it is difficult to dynamically set the tuning parameter so as to elicit the performance of the storage system with respect to temporal changes of I/O characteristics; specifically, short-term changes of I/O characteristics in the storage system.

Accordingly, an aspect of the present invention enables optimal performance tuning by avoiding the deterioration in the performance of a storage system caused by an erroneous setting in a tuning parameter.

To this end, the storage system of the present invention includes a primary volume provided as an operational volume to a host computer; a secondary volume capable of forming a copy-pair with the primary volume; and a storage controller for executing I/O processing respectively to the primary volume and the secondary volume in response to an I/O request issued from the host computer. When the load demanded in executing I/O processing to the secondary volume set with a second tuning parameter is lighter than the load demanded in executing I/O processing to the primary volume set with a first tuning parameter, the storage controller switches the primary/secondary relationship between the primary volume and the secondary volume and provides the secondary volume as the operational volume to the host computer.

By switching the primary/secondary relationship between the primary volume and the secondary volume and providing the secondary volume as the operational volume to the host computer when the load demanded in executing I/O processing to the secondary volume set with a second tuning parameter is lighter than the load demanded in executing I/O processing to the primary volume set with a first tuning parameter, it is possible to achieve optimal performance tuning by avoiding the deterioration in the performance of a storage system caused by an erroneous setting in a tuning parameter.

Incidentally, the load demanded in executing I/O processing of a volume, for instance, is the utilization of a hardware resource or the like.

According to an aspect of the present invention, the storage controller preferably includes a first controller for executing I/O processing to the primary volume, and a second controller for executing I/O processing to the secondary volume.

For example, the first controller replicates an I/O request issued from the host computer to the primary volume, and transfers the replicated I/O request to the second controller. According to the foregoing configuration, because it is possible to separate the hardware to execute I/O processing to the primary volume and the hardware to execute I/O processing to the secondary volume, it is possible to accurately evaluate the load demanded in executing I/O processing to the respective volumes.

In addition, the first controller executes I/O processing to the primary volume in response to the I/O request issued from the host computer to the primary volume, and the second controller executes I/O processing to the secondary volume in response to the I/O request issued from the host computer to the secondary volume. According to the foregoing configuration, because it is possible to separate the hardware to execute I/O processing to the primary volume and the hardware to execute I/O processing to the secondary volume, it is possible to accurately evaluate the load demanded in executing I/O processing to the respective volumes.

When the load demanded in executing I/O processing to the secondary volume is lighter than the load demanded in executing I/O processing to the primary volume during a certain period of time, the storage controller switches the primary/secondary relationship between the primary volume and the secondary volume and provides the secondary volume as the operational volume to the host computer, and, when the load demanded in executing I/O processing to the primary volume is lighter than the load demanded in executing I/O processing to the secondary volume during other periods of time, the storage controller switches the primary/secondary relationship between the secondary volume and the primary volume and provides the primary volume as the operational volume to the host computer.

According to the foregoing configuration, because the primary/secondary relationship of the primary volume and secondary volume is switched following the change of I/O characteristics, it is possible to optimize the performance of the storage system without regard to the change of I/O characteristics.

The storage system according to another aspect of the present invention includes an operational volume to be provided to a host computer; a copy volume capable of forming a copy-pair with the operational volume; a first controller for executing I/O processing to the operation volume in response to an I/O request issued from the host computer and replicating the I/O request; and a second controller for receiving the I/O request replicated by the first controller from the first controller and executing I/O processing to the copy volume. When the load demanded in executing I/O processing to the secondary volume set with a second tuning parameter is lighter than the load demanded in executing I/O processing to the primary volume set with a first tuning parameter, the storage system switches the primary/secondary relationship between the primary volume and the secondary volume and provides the secondary volume as the operational volume to the host computer.

The performance tuning method in accordance with an aspect of the present invention includes the steps of setting a first tuning parameter to a primary volume to be provided as an operational volume to a host computer; creating a secondary volume capable of forming a copy-pair with the primary volume; setting a second tuning parameter to the secondary volume; executing I/O processing respectively to the primary volume and the secondary volume in response to an I/O request issued from the host computer; measuring the load demanded in executing I/O processing to the primary volume; measuring the load demanded in executing I/O processing to the secondary volume; and when the load demanded in executing I/O processing to the secondary volume is lighter than the load demanded in executing I/O processing to the primary volume, switching the primary/secondary relationship between the primary volume and the secondary volume and providing the secondary volume as the operational volume to the host computer.

The performance tuning method according to another aspect of the present invention includes the steps of setting a first tuning parameter to a primary volume; setting a second tuning parameter to a secondary volume capable of forming a copy-pair with the primary volume; executing I/O processing respectively to the primary volume and the secondary volume in response to an I/O request issued from a host computer; measuring the load demanded in executing I/O processing to the primary volume; measuring the load demanded in executing I/O processing to the secondary volume; when the load demanded in executing I/O processing to the secondary volume is lighter than the load demanded in executing I/O processing to the primary volume during a certain period of time, switching the primary/secondary relationship between the primary volume and the secondary volume and providing the secondary volume as an operational volume to the host computer; and when the load demanded in executing I/O processing to the primary volume is lighter than the load demanded in executing I/O processing to the secondary volume during other periods of time, switching the primary/secondary relationship between the secondary volume and the primary volume and providing the primary volume as the operational volume to the host computer.

According to an embodiment of the present invention, it is possible to perform optimal performance tuning by avoiding the deterioration in the performance of a storage system caused by an erroneous setting in a tuning parameter.

DETAILED DESCRIPTION

Embodiments of the present invention will now be explained with reference to the attached drawings. The respective embodiments do not limit the scope of claims, and the features described in the embodiments are not all necessarily required as means for solving the problems of the present invention. Moreover, various aspects and/or components of the described embodiments may be used singly or in any combination in a computerized storage system.

First Embodiment

Figure 1:
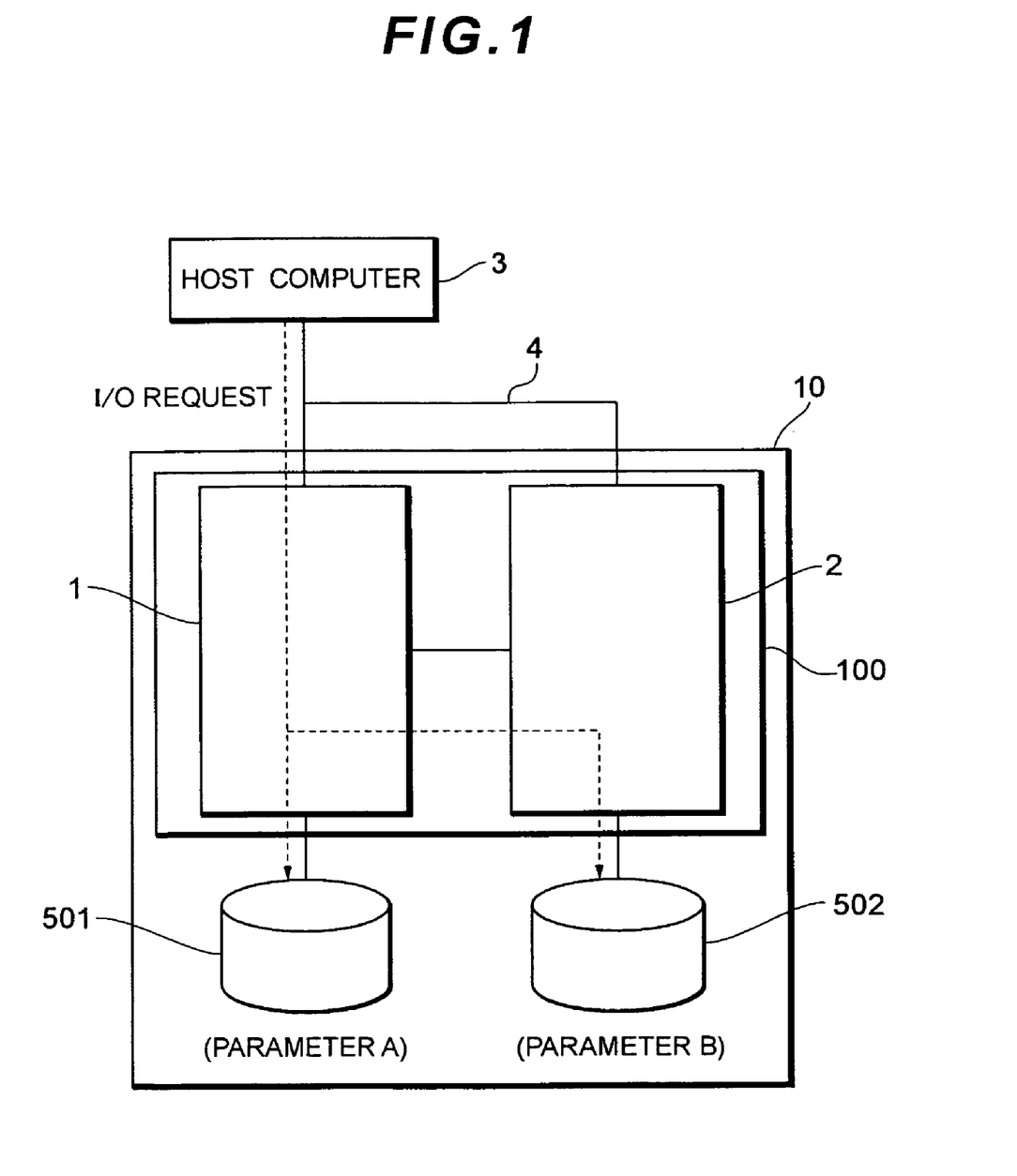
FIG. 1 is a schematic diagram of the performance tuning method of a storage system according to an embodiment of the present invention.

FIG. 1 shows an outline of the performance tuning method of a storage system 10 according to the first embodiment. The storage system 10 has a storage controller 100 and logical volumes 501, 502. The storage controller 100 has controllers 1, 2. The logical volume 502 is a copy volume (replicated volume) of the logical volume 501, and the pair status between the logical volume 501 and logical volume 502 is in a synchronized state. In the following explanation, according to the context, the "logical volume 501" of the copy source is referred to as a "primary volume 501", and the "logical volume 502" of the copy destination is referred to as a "secondary volume 502" or a "copy volume 502". For purposes of the following description, the terms "primary volume" and "operational volume" are synonymous.

The controller 1 executes I/O processing to the primary volume 501, replicates an I/O request sent from a host computer 3 via a network 4, and transfers the replicated I/O request to the controller 2. The controller 2 receives the replicated I/O request from the controller 1, and executes I/O processing to the secondary volume 502. Accordingly, because the hardware resource controlling the I/O processing to the primary volume 501 and the hardware resource controlling the I/O processing to the secondary volume 502 are separated, it is possible to measure the I/O processing performance with sufficient accuracy with respect to both the primary volume 501 and secondary volume 502.

Incidentally, the primary volume 501 is provided as an operational volume to the host computer 3. The host computer 3 recognizes the primary volume 501, but does not recognize the secondary volume 502.

Let it be assumed that the tuning parameter set in the primary volume 501 is "A". In order to change the tuning parameter set in the primary volume 501 from "A" to "B", the storage system 10 foremost tentatively sets the tuning parameter "B" in the secondary volume 502, and determines whether it is possible to confirm the performance gain of I/O processing executed to the secondary volume 502. Specifically, the storage system 10 determines which I/O performance is superior between the primary volume 501 set with the old parameter "A" and the secondary volume 502 set with the new parameter "B".

When it is possible to confirm the performance gain of I/O processing executed to the secondary volume 502, the storage system 10 switches the primary/secondary relationship of the primary volume 501 and the secondary volume 502. As a result, it is possible to provide the logical volume (secondary volume 502 before the switching of the primary/secondary relationship) set with the tuning parameter "B" as the primary volume 501 to the host computer 3.

By changing the tuning parameter set in the primary volume 501 as described above, there is an advantage in that it is possible to avoid deterioration in the performance caused by an erroneous setting of the tuning parameter, and change the tuning parameter while continuing the operation of the primary volume 501.

Figure 2:
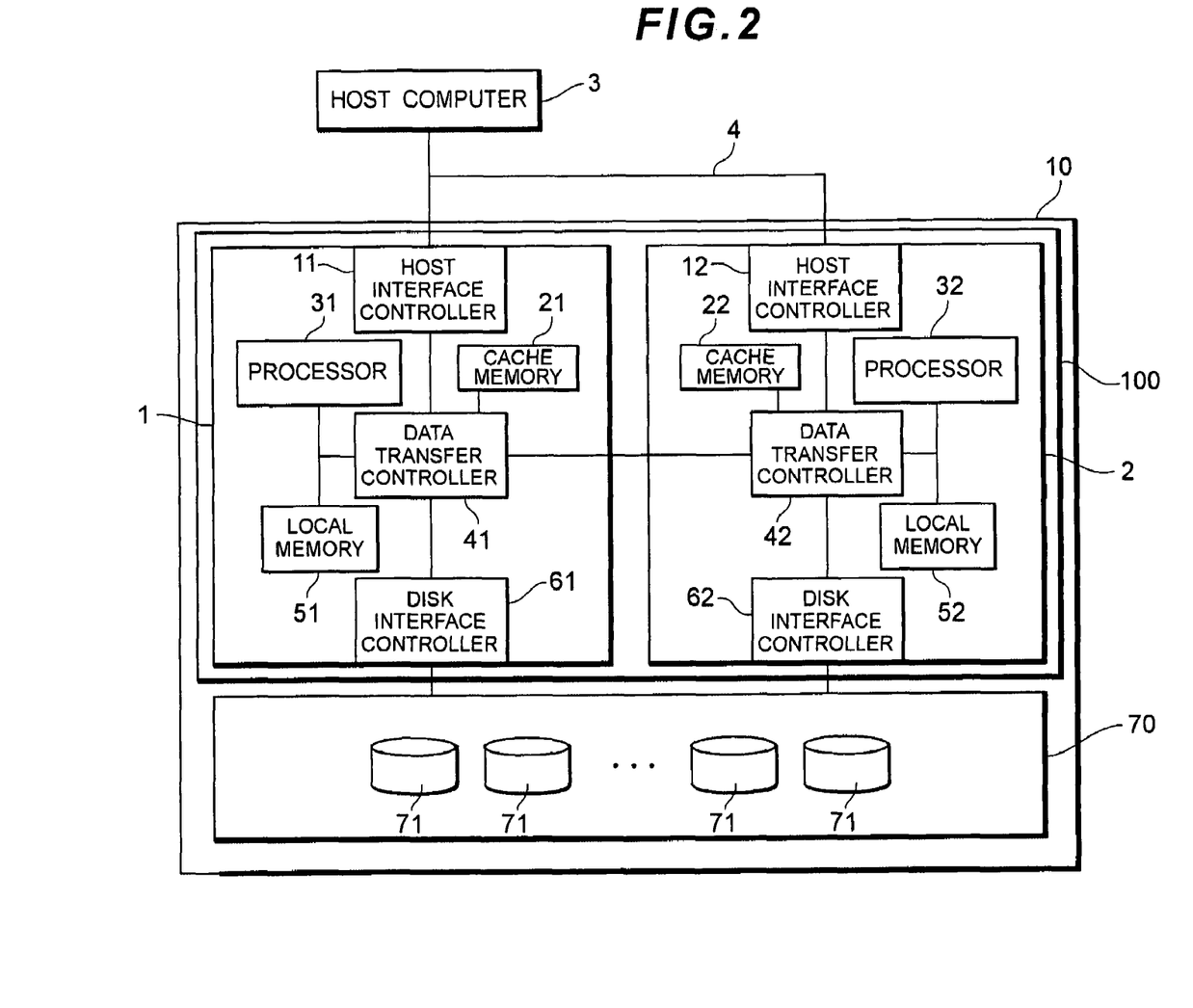
FIG. 2 is a hardware configuration diagram of the storage system.

FIG. 2 shows the hardware configuration of the storage system 10.

The storage system 10 is connected to one or more host computers 3 via the network 4. The host computer 3 is a personal computer, workstation, mainframe or the like. The host computer 3 uses the memory resource provided by the storage system 10 to execute various business processes (for example, database processing, Web application processing, streaming processing and the like).

The network 4 may be implemented, for instance, as a SAN (Storage Area Network), LAN (Local Area Network), PAN (Personal Area Network), MAN (Metropolitan Area Network), WAN (Wide Area Network), Internet, dedicated line, public line and the like.

For example, when the host computer 3 is to be connected to the storage system 10 via a SAN, the host computer 3 requests the input and output of data in block units, which are data management units of the memory resource of the storage system 10, using a protocol such as a fibre channel protocol or iSCSI (internet Small Computer System Interface).

For example, when the host computer 3 is to be connected to the storage system 10 via a LAN, the host computer 3 requests the input and output of data in file units upon designating the file name using a protocol such as NFS (Network File System) or CIFS (Common Interface File System).

The storage apparatus 70 has a plurality of disk drives 71. The disk drives 71, for example, are configured from FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SCSI (Small Computer System Interface) disk drives or the like.

The controllers 1, 2 are able to control the storage apparatus 70 based on a RAID level (for instance 0, 1, 4 or 5) prescribed in a so-called RAID system. A RAID group, for example, is configured by grouping four disk drives 71 as a single group (3D+1P), or grouping eight disk drives 71 as a single group (7D+1P). In other words, the storage extents provided by each of the plurality of disk drives 71 are assembled to configure a single RAID group. The RAID group can also be referred to as a parity group or an ECC group. One or more logical volumes as an access unit from the host computer 3 are defined in the RAID group. A LUN (Logical Unit Number) is assigned to each logical volume.

The controller 1 has a host interface controller 11, a cache memory 21, a processor 31, a data transfer controller 41, a local memory 51, and a disk interface controller 61.

The processor 31 controls the I/O processing (write access or read access) to the storage apparatus 70 in response to the data I/O request from the host computer 3. The local memory 51 stores various micro programs and management tables. As a result of executing the micro programs stored in the logical memory 51, the processor 31 is able to perform the processing for creating a copy volume, processing for setting the tuning parameter, and so on. Details regarding the micro programs and management tables will be described below. The cache memory 21 is a buffer memory for temporary storing data to be read by or written in the storage apparatus 70. The cache memory 21 is provided with backup power, and is configured as a non-volatile memory for preventing loss of cache data even when there is a power failure in the storage system 10.

The data transfer controller 41 interconnects the host interface controller 11, the processor 21, the cache memory 31, the local memory 51, and the disk interface controller 61, and controls the data transfer between the host computer 3 and the storage apparatus 70.

For example, in response to the write request from the host computer 3, the data transfer controller 41 writes the write data received from the host computer 3 via the host interface controller 11 in the cache memory 21. Thereafter, the disk interface controller 61 writes in the storage apparatus 70 the write data that was written in the cache memory 21.

Meanwhile, in response to the read access from the host computer 3, the data transfer controller 41 writes the read data read from the storage apparatus 70 via the disk interface controller 61 in the cache memory 21, and transfers it to the host interface controller 11. The host interface controller 11 sends the read data to the host computer 3.

Incidentally, when the storage apparatus 70 is managed based on RAID level 5, parity data is computed within the data transfer controller 41.

The host interface controller 11 controls the interface between the host computer 3 and the controller 1, and, for instance, is configured to receive a block access request from the host computer 3 based on a fibre channel protocol, and a file access request from the host computer 3 based on a file transfer protocol. In order to process the file access request from the host computer 3, the host interface controller 11 needs to be equipped with the NAS (Network Attached Storage) function.

The disk interface controller 61 controls the interface between the storage apparatus 70 and the controller 1, and, for instance, is configured to control the data I/O request to the storage apparatus 70 according to a protocol controlling the storage apparatus 70.

Meanwhile, the controller 2 has a host interface controller 12, a cache memory 22, a processor 32, a data transfer controller 42, a local memory 52, and a disk interface controller 62. The hardware configuration of the controller 2 is the same as the hardware configuration of the controller 1, and the detailed explanation of the hardware configuration of the controller 2 is omitted.

Figure 3:
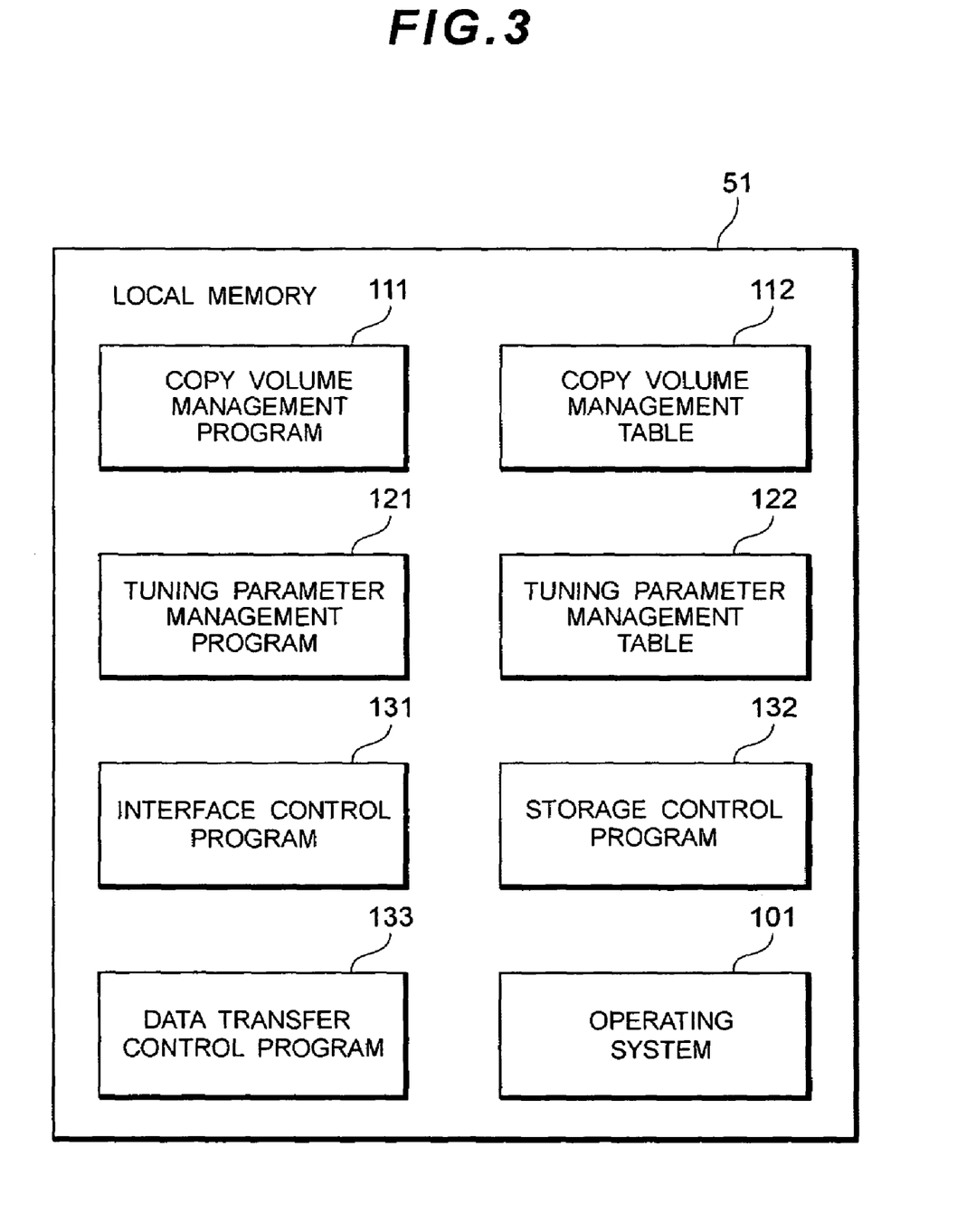
FIG. 3 is a software configuration diagram in the local memory.

FIG. 3 is a software configuration in the local memory 51.

The local memory 51 stores a copy volume management program 111, a copy volume management table 112, a tuning parameter management program 121, a tuning parameter management table 122, an interface control program 131, a storage control program 132, a data transfer control program 133, and an operating system 101.

The copy volume management program 111 performs processing relating to the copy volume. For example, the copy volume management program 111 executes processing for creating a copy volume (secondary volume 502) upon receiving a copy volume creation command, processing for issuing an I/O request synchronously or asynchronously to the secondary volume 502 upon receiving an I/O request to the primary volume 501, and processing for managing the relationship of the primary volume 501 and the secondary volume 502.

The copy volume management table 112 retains information showing the relationship of the primary volume 501 and the secondary volume 502. Details regarding the copy volume management table 112 will be described below.

The tuning parameter management program 121 sets the tuning parameter regarding the respective volumes in the storage system 10.

The tuning parameter management table 122 retains the tuning parameters set to the respective volumes in the storage system 10. Details regarding the tuning parameter management table 122 will be described below.

The interface control program 131 is driver software for controlling the host interface controller 11 and the disk interface controller 61.

The storage control program 132 executes address conversion processing for converting the logical address and physical address in the disk drive 71, processing for converting the RAID configuration of the disk drive 71, and so on.

The data transfer control program 133 controls the data in the data transfer controller 41; that is, it controls the data transfer among the host interface controller 11, the processor 21, the cache memory 31, the local memory 51, and the disk interface controller 61, respectively.

The operating system 101 schedules the execution of the respective micro programs.

Figure 4:
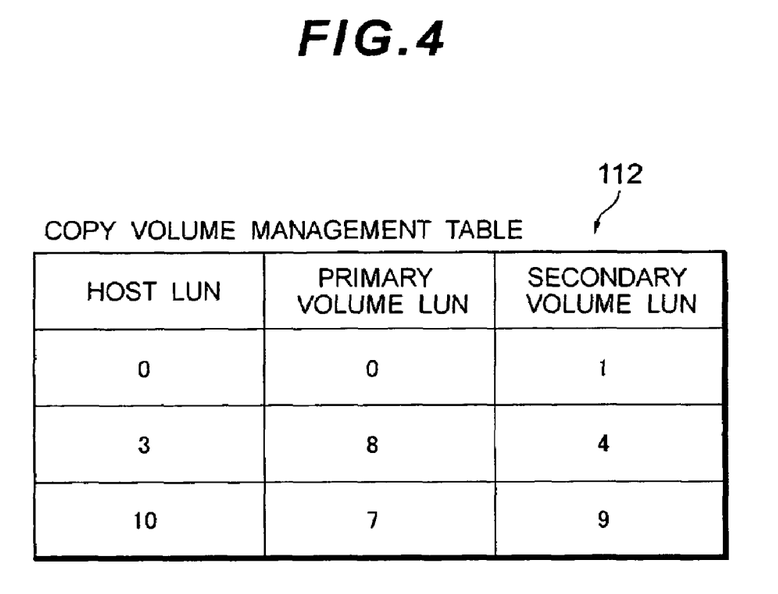
FIG. 4 is an explanatory diagram of a copy volume management table.

FIG. 4 shows the table configuration of the copy volume management table 112.

The copy volume management table 112 associates the host LUN, the primary volume LUN, and the secondary volume LUN with respect to the respective logical volumes. The host LUN represents the LUN of the primary volume 501 recognized by the host computer 3. The primary volume LUN represents the LUN of the primary volume 501 managed inside the storage system 10. The secondary volume LUN represents the LUN of the secondary volume 502 managed in the storage system 10. For instance, in the illustrated example, the primary volume of LUN "8" and the secondary volume of LUN "4" are of a pair relationship, and shows that the primary volume of LUN "8" is being recognized by the host computer 3 as the logical volume of LUN "3".

The copy volume management program 111 is able to switch the primary/secondary relationship between the primary volume 501 and the secondary volume 502 by switching the primary volume LUN and the secondary volume LUN. For example, in the illustrated example, by switching the primary volume LUN "8" and the secondary volume LUN "4", the primary volume of LUN "8" is changed to a secondary volume, and the secondary volume of LUN "4" is changed to a primary volume.

Incidentally, information retained in the copy volume management table 112 is not limited to the information shown in FIG. 4. When the processing for synchronizing the primary volume 501 and the secondary volume 502 is to be executed asynchronously, the copy volume management table 112 may store the existence of difference data, storage location of difference data, start time of synchronous copy, and information concerning the pair status (pair synchronization, pair split, initial copy or the like).

Figure 5:
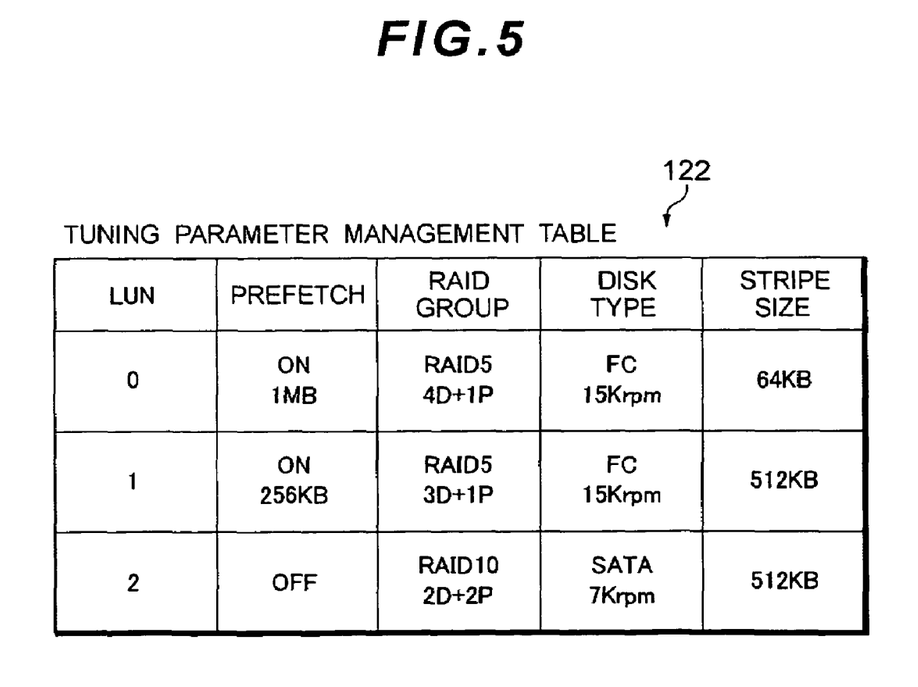
FIG. 5 is an explanatory diagram of a tuning parameter management table.

FIG. 5 shows the table configuration of the tuning parameter management table 122.

The tuning parameter management table 122 associates the "LUN", "prefetch", "RAID group", "disk type", and "stripe size" regarding the respective logical volumes. Here, "LUN" represents the LUN of the logical volume set with a tuning parameter. "Prefetch" represents the flag information on whether to execute prefetch in the sequential mode and the prefetch size upon executing prefetch. "RAID group" represents the RAID level and drive configuration. For instance, taking RAID 5 as an example, the drive configuration represents whether the configuration of the disk drive 71 is (4D+1P) or (3D+1P). "Disk type" represents the physical specification of the disk drive 71. As the physical specification, for instance, there are the type of interface protocol of the disk drive 71 (for example, FC protocol, SATA protocol, or the like), and disk rotating speed. "Stripe size" represents the partitioning size (striping unit) of data to be written respectively in the plurality of disk drives 71 arranged in accordance with a RAID configuration.

Incidentally, among the foregoing tuning parameters, because "prefetch" relates to the internal control of the storage system 10, it can be changed in a short time and with a low load. Contrarily, "RAID group", "disk type", and "stripe size" all relate to the external specification of the storage system 10, and, because data migration among the disk drives 71 is required for changing these tuning parameters, much time and a high load will be required. This implies that, if the setting of the tuning parameter relating to the external specification is mishandled, the overhead pertaining to the parameter change as well as the overhead for restoring the parameter will become significant.

Incidentally, because the tuning parameter shown in FIG. 5 is merely a general example, there is no particular limitation on the tuning parameter so as long as it is a parameter relating to the performance of the storage system 10 and the setting thereof can be changed. For example, as the tuning parameter relating to internal control, "size of collective writing" of sequential writing may be included. As another example, the limiting value of the various hardware resources (processor resource, memory resource, bus resource, and so on), and the limiting value of the logical resources (logical volume and so on) may also be included.

Figure 6:
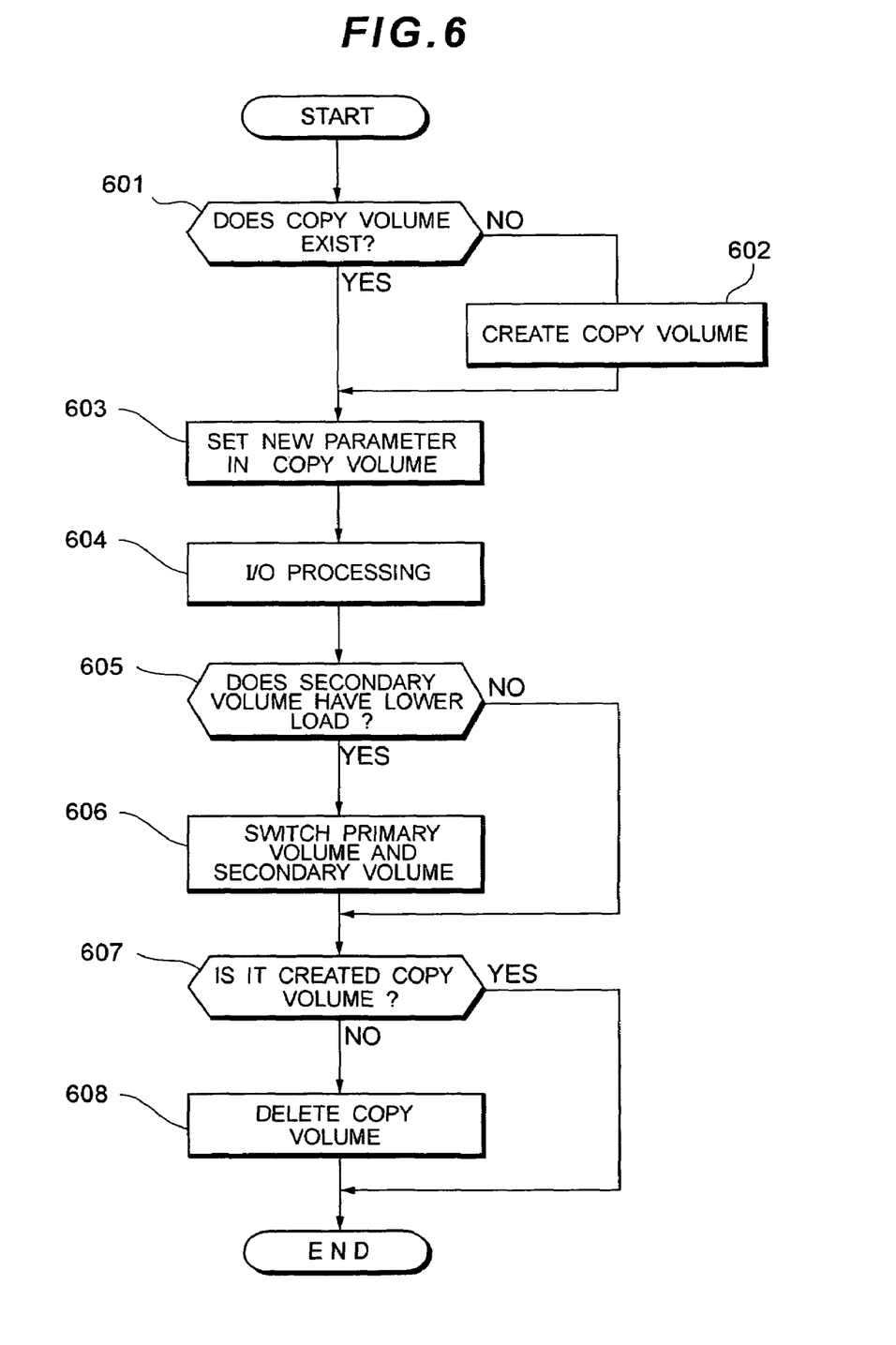
FIG. 6 is a flowchart showing a tuning parameter setting processing routine.

FIG. 6 shows a flowchart illustrating the tuning parameter setting processing routine.

The storage system 10 foremost determines whether the logical volume 501 to change the tuning parameter has a copy volume 502 in a pair relationship with the logical volume 501 (step 601).

When the logical volume 501 has a copy volume 502 (step 601: YES), the storage system 10 executes the processing at S403. Meanwhile, when the logical volume 501 does not have a copy volume 502 (step 601; NO), the storage system 10 creates a copy volume 502 capable of forming a copy-pair with the logical volume 501 (step 602), and executes the processing at step 603.

For the sake of convenience, in the following explanation, the logical volume 501 is referred to as the primary volume 501 and the copy volume 502 is referred to as the secondary volume 502.

The storage system 10 tentatively sets in the copy volume 502 the tuning parameter to be newly set in the logical volume 501 (step 603).

The storage system 10 issues to the primary volume 501 the I/O request issued from the host computer 3, copies such I/O request, and issues the copied I/O request to the secondary volume 502 (step 604).

Incidentally, because step 604 is processing for evaluating the respective performances of the primary volume 501 and the secondary volume 502, the processing time of step 604 is preferably set according to the I/O characteristics. For example, when the variable period of the I/O characteristics is long (when the fluctuation of the I/O characteristics is gradual), it is possible to evaluate the performance of the respective volumes with sufficient accuracy even with short measurement time. Meanwhile, when the variable period of the I/O characteristics is short (when the fluctuation of the I/O characteristics is sudden), because it is not possible to evaluate the performance of the respective volumes with sufficient accuracy with short measurement time, it is necessary to set the measurement time to be longer.

Next, the storage system 10 determines whether the I/O processing executed to the secondary volume 502 is of a lower load in comparison to the I/O processing executed to the primary volume 501 (step 605). The term "load" as used herein refers to the utilization (processor utilization, memory utilization, bus utilization and so on) of the various resources (processor resource, memory resource, bus resource and so on) required by the storage system 10 to perform I/O processing.

When the I/O processing executed to the primary volume 501 is of a lower load than the I/O processing executed to the secondary volume 502 (step 605; NO), because this represents that the secondary volume 502 set with a new tuning parameter has lower performance, the storage system 10 proceeds to the processing at step 607.

Meanwhile, when the I/O processing executed to the secondary volume 502 is of a lower load than the I/O processing executed to the primary volume 501 (step 605; YES), because this represents that the secondary volume 502 set with a tuning parameter has higher performance, the storage system 10 switches the primary volume LUN and the secondary volume LUN in the copy volume management table 112 so as to switch the primary/secondary relationship between the primary volume 501 and the secondary volume 502 (step 606). As a result of this processing, the high performance secondary volume 502 set with the tuning parameter can be thereafter operated as the primary volume 501.

Next, the storage system 10 determines whether the secondary volume 502 before the switch of the primary/secondary relationship or the primary volume 501 after the switch of the primary/secondary relationship is a copy volume created by way of the processing at step 602 (step 607).

When the secondary volume 502 before the switch of the primary/secondary relationship or the primary volume 501 after the switch of the primary/secondary relationship is a copy volume created by way of the processing at step 602 (step 607; YES), the storage system 10 deletes the copy volume created by way of the processing at step 602 (step 608), and exits the tuning parameter setting processing routine.

Meanwhile, when neither the secondary volume 502 before the switch of the primary/secondary relationship nor the primary volume 501 after the switch of the primary/secondary relationship is a copy volume created by way of the processing at step 602 (step 607; NO), the storage system 10 exists the tuning parameter setting processing routine.

According to the present embodiment, it is possible to perform optimal performance tuning by avoiding the deterioration in the performance of a storage system caused by an erroneous setting in a tuning parameter. Further, because optimal performance tuning can be realized without having to suspend the operation of the operational volume, the present invention is superior in user-friendliness.

Second Embodiment

Figure 7:
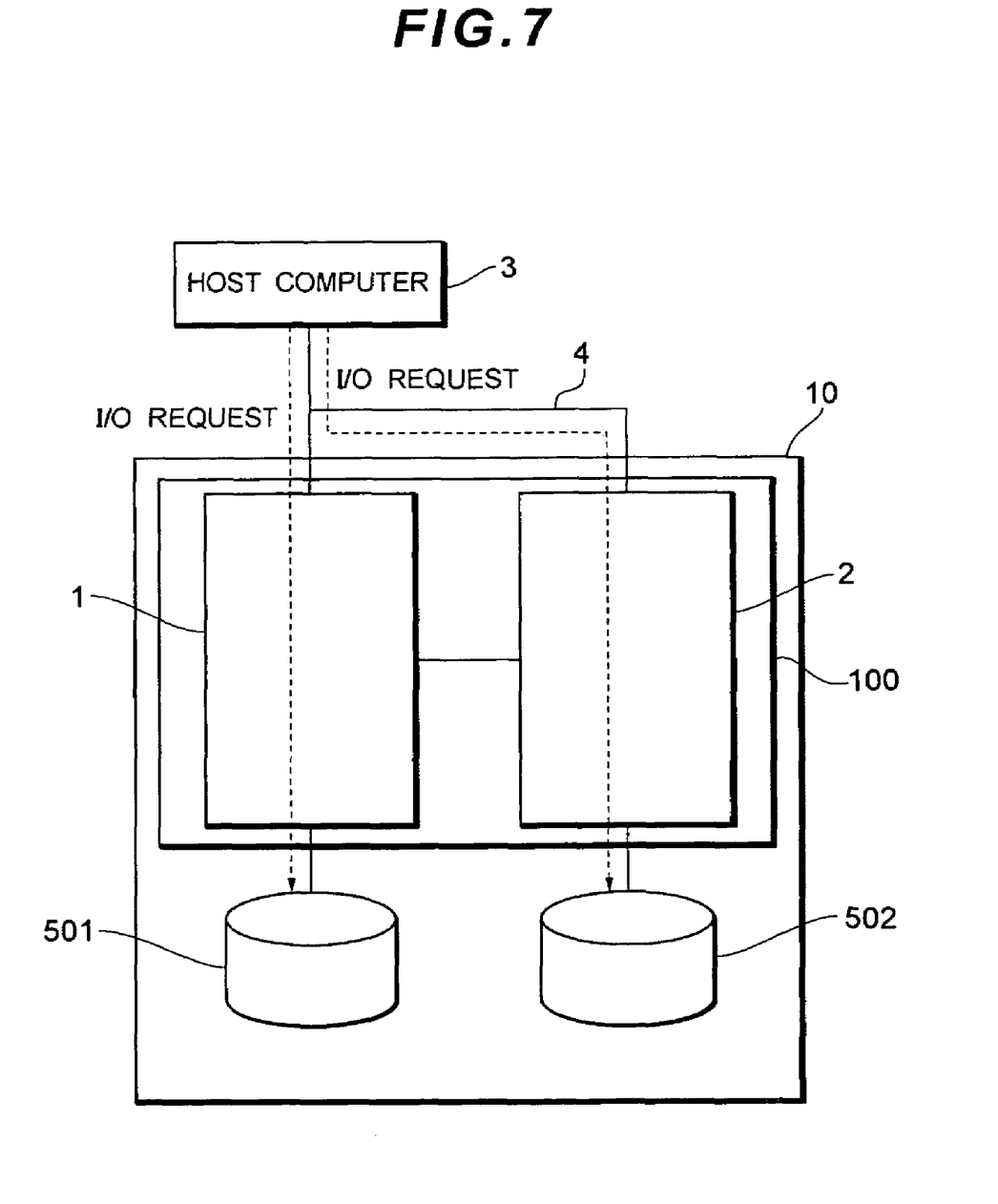
FIG. 7 is a schematic diagram of the performance tuning method of a storage system according to another embodiment of the present invention.

FIG. 7 shows an outline of the performance tuning method of the storage system 10 according to the second embodiment. Components that are the same as those illustrated in FIG. 1 are given the same reference numeral, and the detailed explanation thereof is omitted. Because the tuning parameter setting method according to the second embodiment is similar to the tuning parameter setting method according to the first embodiment, the differences between the two will be mainly explained.

In the first embodiment, the host computer 3 only recognizes the primary volume 501, and does not recognize the secondary volume 502. The I/O request issued from the host computer 3 to the primary volume 501 is replicated using the controller 1, and then transferred to the controller 2. The controller 2 receives the replicated I/O request and executes the I/O processing to the secondary volume 502.

Meanwhile, in the second embodiment, the host computer 3 recognizes the secondary volume 502 in addition to the primary volume 501, and issues the I/O request respectively to the primary volume 501 and the secondary volume 502. In other words, the controller 1 does not have to replicate the I/O request issued from the host computer 3. As a result of the foregoing configuration, it is possible to completely separate the hardware resource controlling the I/O processing executed to the primary volume 501 and the hardware resource controlling the I/O processing executed to the secondary volume 502, and measure the I/O processing performance with sufficient accuracy with respect to both the primary volume 501 and the secondary volume 502.

Third Embodiment

Figure 8:
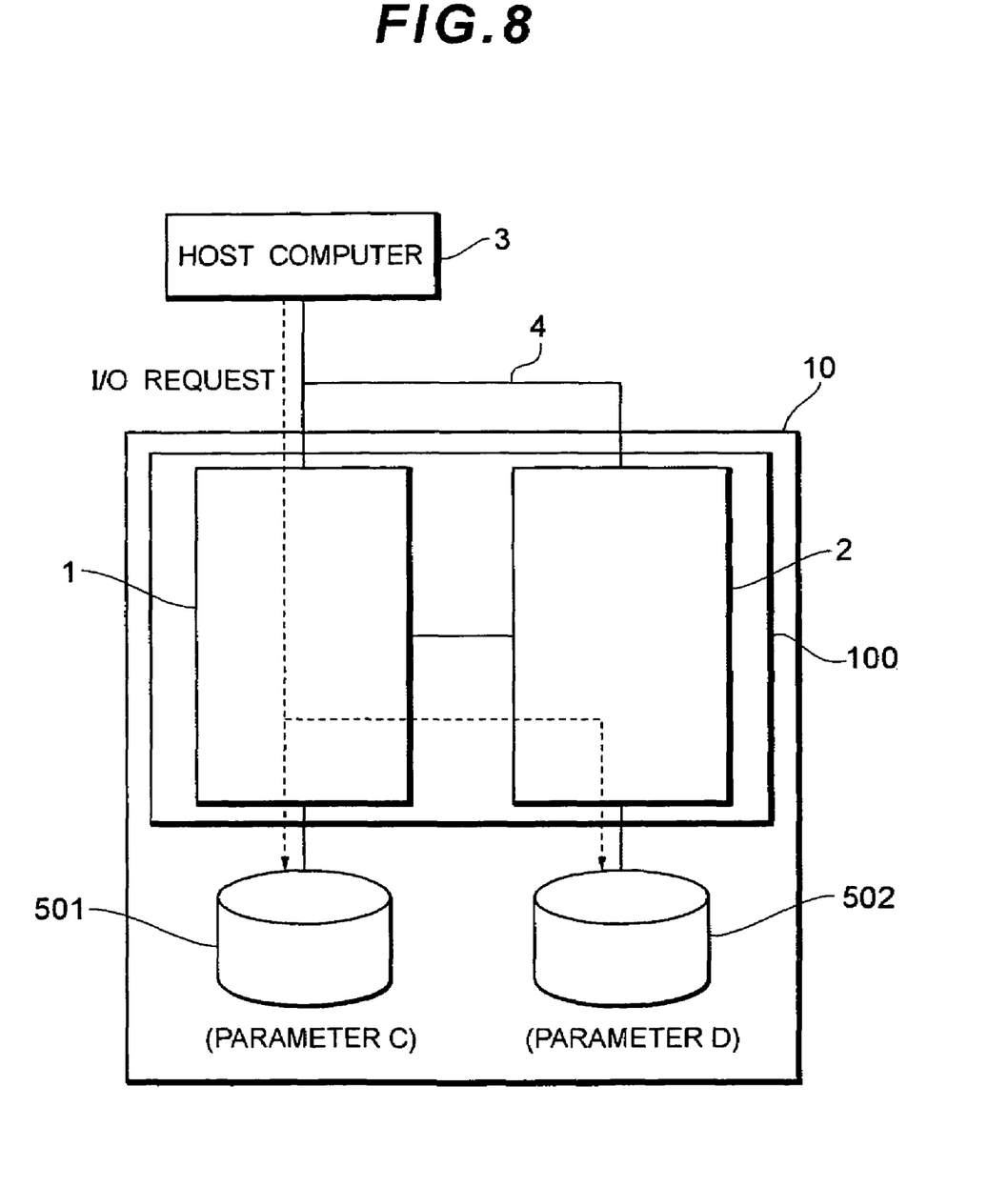
FIG. 8 is a schematic diagram of the performance tuning method of a storage system according to another embodiment of the present invention.

FIG. 8 shows an outline of the performance tuning method of the storage system 10 according to the third embodiment. Components that are the same as those illustrated in FIG. 1 are given the same reference numeral, and the detailed explanation thereof is omitted. The host computer 3 only recognizes the primary volume 501, and does not recognize the secondary volume 502. The I/O request issued from the host computer 3 to the primary volume 501 is replicated using the controller 1, and then transferred to the controller 2. The controller 2 receives the replicated I/O request and executes the I/O processing to the secondary volume 502.

In the third embodiment, different tuning parameters are respectively set in the primary volume 501 and the secondary volume 502. For example, let it be assumed that the tuning parameter set in the primary volume 501 is "C", and the tuning parameter set in the secondary volume 502 is "D".

When anticipating a case where the I/O characteristics of the host computer 3 will change with time, there may be cases where the I/O processing performance of the primary volume 501 is of high performance (low load) and the I/O processing performance of the secondary volume 502 is of low performance (high load) during a certain period of time, but the I/O processing performance of the primary volume 501 is of low performance (high load) and the I/O processing performance of the secondary volume 502 is of high performance (low load) during other periods of time. In a case where the synchronization processing from the primary volume 501 to the secondary volume 502 is being executed asynchronously, the response time of the primary volume 501 will become the response time of the operational volume.

Thus, the storage system 10 measures the I/O processing performance with respect to both the primary volume 501 and the secondary volume 502, and continues the operation when the I/O processing of the primary volume 501 is of higher performance. Meanwhile, when the I/O processing performance of the secondary volume 502 is of higher performance, the storage system 10 switches the primary/secondary relationship of the primary volume 501 and the secondary volume 502, and operates the logical volume (secondary volume 502 before the switching of the primary/secondary relationship) having the higher I/O processing performance as the primary volume 501.

For example, a tuning parameter suitable for backup processing is set to the secondary volume 502, and, at night, the storage system 10 switches the primary/secondary relationship between the primary volume 501 and the secondary volume 502 to perform backup processing.

According to this I/O processing method, it is possible to constantly optimize the I/O processing performance of the storage system 10.

Figure 9:
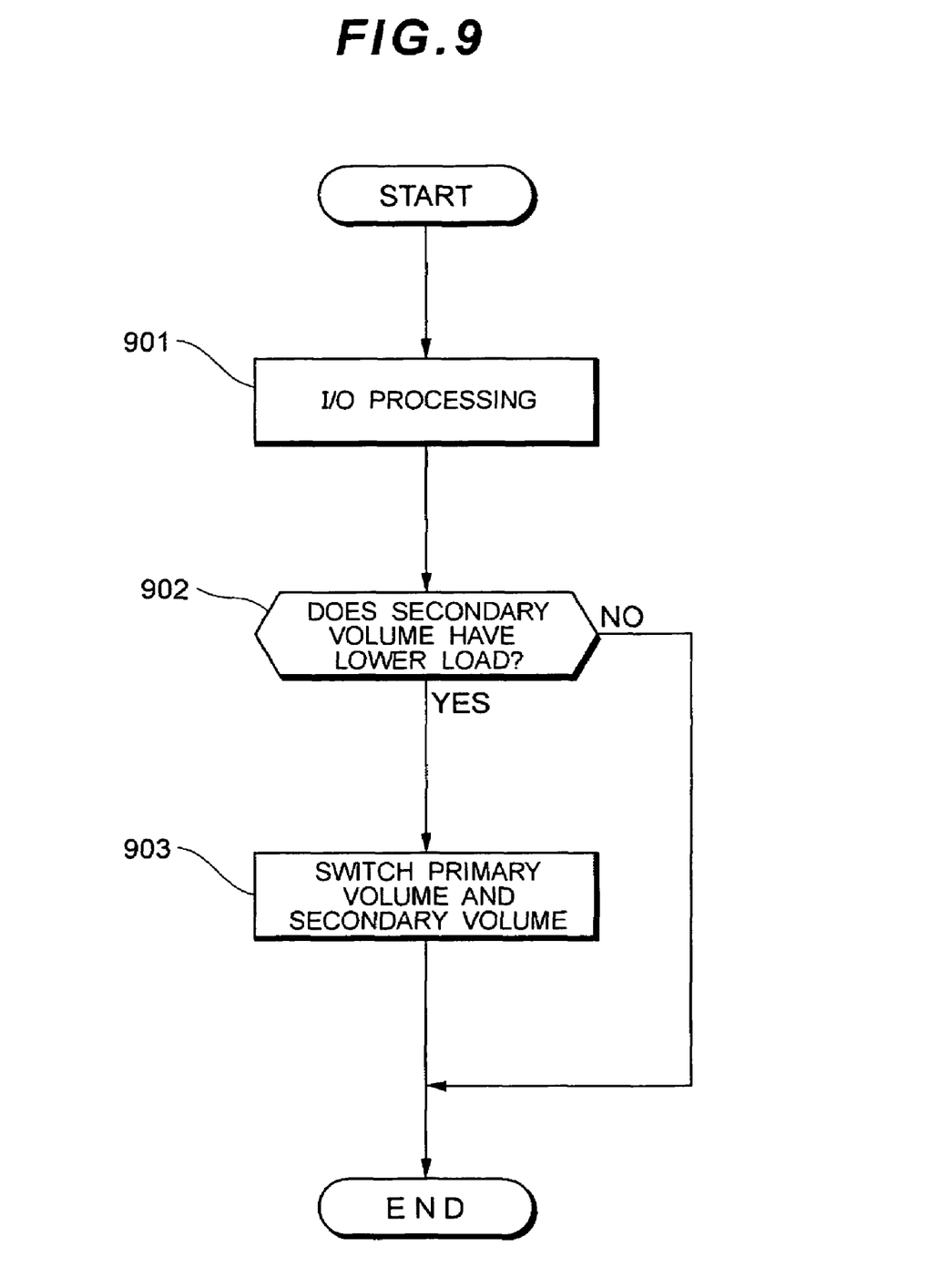
FIG. 9 is a flowchart showing the performance tuning processing routine.

FIG. 9 is a flowchart showing the I/O processing routine according to the third embodiment.

The storage system 10 issues to the primary volume 501 the I/O request originating from the host computer 3, copies such I/O request, and issues the copied I/O request to the secondary volume 502 (step 901).

Next, the storage system 10 determines whether the I/O processing executed to the secondary volume 502 is of a lower load than the I/O processing executed to the primary volume 501 (step 902). In the third embodiment, because the objective is to follow the change of I/O characteristics involving sudden fluctuations, the measurement time of I/O processing performance of both the primary volume 501 and the secondary volume 502 may be a short period of time. The user may also freely set the measurement time of I/O processing performance.

When the I/O processing executed to the secondary volume 502 is of a lower load than the I/O processing executed to the primary volume 501 (step 902; YES), the storage system 10 switches the primary/secondary relationship of the primary volume 501 and the secondary volume 502 (step 903), operates the logical volume (secondary volume 502 before the switching of the primary/secondary relationship) having the higher I/O processing performance as the primary volume 501, and exits the I/O processing routine.

Meanwhile, when the I/O processing executed to the secondary volume 502 is of a higher load than the I/O processing executed to the primary volume 501 (step 902; NO), the storage system 10 exits the I/O processing routine.

Incidentally, in the third embodiment, it is also possible to create a plurality of copy volumes capable of forming a copy-pair with the primary volume, set different tuning parameters respectively to all logical volumes (primary volume and all copy volumes), and operate the logical volume exhibiting high I/O processing performance at any given time as the primary volume.

According to the present embodiment, because the primary/secondary relationship of the primary volume 501 and the secondary volume 502 is switched upon following the changes in the I/O characteristics of the primary/secondary relationship, it is possible to optimize the performance of the storage system 10 regardless of the fluctuation of I/O characteristics.

I claim:

1. A storage system, comprising:
   a primary volume provided as an operational volume to a host computer;
   a secondary volume operable to form a copy-pair with said primary volume; and
   a storage controller operable to execute I/O processing respectively to said primary volume and said secondary volume in response to an I/O request issued from said host computer;
   wherein, if a load demanded for executing I/O processing to said secondary volume set with a second tuning parameter is lighter than the load demanded for executing I/O processing to said primary volume set with a first tuning parameter, said storage controller is operable to switch the primary/secondary relationship between said primary volume and said secondary volume and provide said secondary volume as the operational volume to said host computer,
   if the load demanded in executing I/O processing to said secondary volume is lighter than the load demanded in executing I/O processing to said primary volume during a certain period of time, said storage controller is operable to switch the primary/secondary relationship between said primary volume and said secondary volume and provide said secondary volume as an operational volume to said host computer, and
   if the load demanded in executing I/O processing to said primary volume is lighter than the load demanded in executing I/O processing to said secondary volume during other periods of time, said storage controller is operable to switch the primary/secondary relationship between said secondary volume and said primary volume and provide said primary volume as the operational volume to said host computer.

2. The storage system according claim 1, wherein said storage controller comprises a first controller operable to execute I/O processing to said primary volume, and a second controller operable to execute I/O processing to said secondary volume.

3. The storage system according to claim 2, wherein said first controller is operable to replicate an I/O request issued from said host computer to said primary volume, and transfer the replicated I/O request to said second controller.

4. The storage system according to claim 2, wherein said first controller is operable to execute I/O processing to said primary volume in response to the I/O request issued from said host computer to said primary volume, and said second controller is operable to execute I/O processing to said secondary volume in response to the I/O request issued from said host computer to said secondary volume.

5. The storage system according to claim 1, further comprising a plurality of said secondary volumes operable to form a copy-pair with said primary volume.

6. A storage system, comprising:
   a primary volume provided as an operational volume to be provided to a host computer;

a secondary volume provided as a copy volume operable to form a copy-pair with said operational volume;

a first controller operable to execute I/O processing to said operation volume in response to an I/O request issued from said host computer and replicate said I/O request; and a second controller operable to receive the I/O request replicated by said first controller from said first controller and execute I/O processing to said copy volume;

wherein, if a load demanded in executing I/O processing to said secondary volume set with a second tuning parameter is lighter than the load demanded in executing I/O processing to said primary volume set with a first tuning parameter, said second storage controller is operable to switch the primary/secondary relationship between said primary volume and said secondary volume and provide said secondary volume as the operational volume to said host computer, if the load demanded in executing I/O processing to said secondary volume is lighter than the load demanded in executing I/O processing to said primary volume during a certain period of time, said storage controller is operable to switch the primary/secondary relationship between said primary volume and said secondary volume and provide said secondary volume as an operational volume to said host computer, and if the load demanded in executing I/O processing to said primary volume is lighter than the load demanded in executing I/O processing to said secondary volume during other periods of time, said storage controller is operable to switch the primary/secondary relationship between said secondary volume and said primary volume and provide said primary volume as the operational volume to said host computer.

7. A performance tuning method of a storage system, comprising the steps of:

setting a first tuning parameter to a primary volume to be provided as an operational volume to a host computer;

creating a secondary volume operable to form a copy-pair with said primary volume;

setting a second tuning parameter to said secondary volume;

executing I/O processing respectively to said primary volume and said secondary volume in response to an I/O request issued from said host computer;

measuring a load demanded in executing I/O processing to said primary volume;

measuring a load demanded in executing I/O processing to said secondary volume; and if the load demanded in executing I/O processing to said secondary volume is lighter than the load demanded in executing I/O processing to said primary volume, switching the primary/secondary relationship between said primary volume and said secondary volume and providing said secondary volume as the operational volume to said host computer, if the load demanded in executing I/O processing to said secondary volume is lighter than the load demanded in executing I/O processing to said primary volume during a certain period of time, switching the primary/secondary relationship between said primary volume and said secondary volume and providing said secondary volume as the operational volume to said host computer; and if the load demanded in executing I/O processing to said primary volume is lighter than the load demanded in executing I/O processing to said secondary volume during other periods of time, switching the primary/secondary relationship between said secondary volume and said primary volume and providing said primary volume as the operational volume to said host computer.

8. A performance tuning method of a storage system, comprising the steps of:

setting a first tuning parameter to a primary volume;

setting a second tuning parameter to a secondary volume operable to form a copy-pair with said primary volume;

executing I/O processing respectively to said primary volume and said secondary volume in response to an I/O request issued from a host computer;

measuring a load demanded in executing I/O processing to said primary volume;

measuring a load demanded in executing I/O processing to said secondary volume;

if the load demanded in executing I/O processing to said secondary volume is lighter than the load demanded in executing I/O processing to said primary volume during a certain period of time, switching the primary/secondary relationship between said primary volume and said secondary volume and providing said secondary volume as an operational volume to said host computer; and if the load demanded in executing I/O processing to said primary volume is lighter than the load demanded in executing I/O processing to said secondary volume during other periods of time, switching the primary/secondary relationship between said secondary volume and said primary volume and providing said primary volume as an operational volume to said host computer.

* * * * *